3,267,188
METHOD FOR FORMING COMPOSITE BOARD
Kendall H. Bassett and Edward M. Williston, Longview, Wash., assignors to Weyerhaeuser Company, Tacoma, Wash., a corporation of Washington
No Drawing. Filed Mar. 9, 1964, Ser. No. 350,560
10 Claims. (Cl. 264—122)

This invention relates to a method of forming composite board having a phenolic resin binder system. More specifically, this invention relates to a method of forming a composite board using a post heat treatment to completely cure a binary resin binder system to produce water-resistant composite boards having sufficient strength properties to withstand varying conditions In the art of forming composite boards, it is the practice in the industry to combine a resin with comminuted wood and then press the combined resin and comminuted wood into a finished board.

This type of board lacks stability and water resistance. Attempts have been made to solve this problem by adding more resin to the system to gain better stability and higher water resistance. These boards are uneconomical and increased water resistance is usually not obtained.

The present invention is directed to a process that significantly reduces the difficulties encountered in the prior art by forming a binary resin system which develops its full properties upon post heat treatment. A green phenolic resin is used to gain good stability and water resistance and an advanced phenolic resin gives greater strength and shorter press time. Composite boards made in accordance with this invention are particularly suitable for outside use.

A green phenolic resin may be defined as a low molecular weight phenol formaldehyde resin having from 1.5 to 2.6 moles of formaldehyde per mole of phenol and low in caustic content of a type commonly used for impregnation of cellulosic material. Advanced resin may be defined as a medium molecular weight phenol formaldehyde resin having from 1.5 to 2.6 moles of formaldehyde per mole of phenol with from 2–4% caustic content of a type commonly used for a binder of hardboard and particleboard.

An object of this invention is to provide a method of forming composite board employing a binary binder system with a post heat treatment procedure.

Another object of this invention is to provide a method of forming composite board having a binary phenolic resin binder system which provides the composite board with high stability and water-resistance properties.

In the practice of the present invention wood chips are first placed into a conventional defibrator or other mechanism for comminuting wood and reduced to the desired size and shape. The types of wood that may be used to practice the present invention are any type species suitable for forming composite boards, such as Douglas fir, white fir, hemlock, ponderosa pine, or any combination of the above species.

As the comminuted wood is exhausted from the mechanism, the resin binder system may be added to the chips. However, the binder system may be added at any convenient time. The amount of resin used may range from 4–25% by weight of the total comminuted wood chips but is preferably around 9%. The resin employed is a mixture of green resin and advanced resin. The amount of green resin used with the advanced resin may range from 1 to 20 parts of green phenolic resin to 1 part of advanced phenolic resin. However, it is preferred to use a ratio of 4 parts of green phenolic resin to 1 part of advanced phenolic resin.

As noted above, the green resins that are usable with the present invention may be characterized by a low molecular weight phenol formaldehyde resin having from 1.5 to 2.6 moles of formaldehyde per mole of phenol and low in caustic content of a type commonly used for impregnation of cellulose materials. Typical examples of the green resins that are suitable for use with the present invention are sold under the trade name Amres 13932 by Pacific Resins and Chemicals Company of Seattle, Washington. Another example of a green resin suitable for use with the present invention is sold under the trade name of Poly Phen L118 by National Polychemicals, Inc., of Wilmington, Massachusetts The advanced resins usable with the present invention are characterized as a medium molecular weight phenol formaldehyde resin having from 1.5 to 2.6 moles of formaldehyde per mole of phenol with from 2–4% caustic content of a type commonly used for a binder in hardboard and particleboard. Typical examples of advanced resins suitable for use with the present inventon are sold under the trade names of Amres 6121 and Amres 6130 by the Pacific Resins and Chemicals Company of Seattle, Washington. While the above resins are suitably usable with the present invention, it should be pointed out that other green and advanced resins may be readily used with the present invention so long as the resins meet the requirements as set forth for the green and advanced resins.

After the resin system and comminuted wood are thoroughly mixed, they are then conveyed to a conventional dryer and then fed into a conventional mat forming apparatus. The forming apparatus consists of a felter head or former that feeds a predetermined amount of comminuted wood onto a moving belt. The mat structure is then trimmed and cut to the desired size. The felted mats in this condition may be immediately put into a press or they may be stored for future use.

The felted mats are run into a standard press mechanism having upper and lower heated platens. The mat is placed between the heated platens which are heated from 300° to 500° F. but preferably around 400° F. for from about 3 to 15 min. but preferably around 8 min. The pressure used for this pressing operation may range from about 20 p.s.i. to about 1500 p.s.i. depending upon the density of board that is to be formed. The press may be provided with stops to give the finished board a predetermined thickness and of course a predetermined density. Accordingly, only a sufficient amount of pressure will be used to close the press to the stops.

After the boards have been removed from the press they will be placed into a circulating oven for from 2½ to 6 hrs. The temperature of the oven will be maintained between 300 and 360° F. It should be noted that the upper limit of this range will be set by the fire hazard inherent in the material. Accordingly, if too high a temperature is maintained, the boards may ignite.

It is believed that the mechanism for the principle of operation of the present invention is as follows. The green resin impregnates the comminuted wood and bulks the cell wall, thus imparting stability to the comminuted wood. Also, by impregnating the green resin into the comminuted wood, it will display a high water-resistance property. Moreover, some bonding is also performed by the green phenolic resin. The advanced resin is primarily a bonding resin and will coat the comminuted wood which provides short press times and good strengths. Accordingly, when the felted mat is placed into the press and the press cycle is completed, the advanced phenolic resin is probably completely cured and the green phenolic resin is probably only partially cured. The cured board is placed into an oven to completely cure the green resin within the board. Accordingly, the overall properties of the finished board are superior to any board that is formed with either the green phenolic resin or advanced phenolic resin used separately.

In order to further illustrate the manner in which this invention is performed, the following example is given.

*Example I*

In this example a mixture of 80% ponderosa pine and 20% white fir was used as the base furnish. The chip furnish was first placed into a conventional defibrator and defibrated. The resin was added at the exit orifice to the defibrator. The amount of resin used based on the base furnish weight was 9% of phenolic resin consisting of 4 parts of green resin to 1 part of advanced phenolic resin. Both resins were used at 50% solids. The base furnish and resin system were then dried and felted in the normal manner. The furnish was felted into a mat which would produce a 40 lb. per cu. ft. density board. The mats were then placed in a press for 8 min. at 400° F. at a pressure of 100 p.s.i. Following the press cycle, the board was heat treated for 3½ hrs. at 340° F.

Boards made in accordance with this invention have been extensively tested in the laboratory and have displayed the results as indicated in the following table.

TABLE I

| Resin System | Treatment | Modulus of Rupture, p.s.i. | Water Absorption, percent | Thickness Swell, percent | |
|---|---|---|---|---|---|
| | | | | Center | Edge |
| Green and Advanced Phenolic at 4:1 ratio. | Press cured with heat treatment. | 4,120 | 8.5 | 3.8 | 5.5 |
| Do | Press cured without heat treatment. | 3,510 | 11.5 | 4.0 | 10.4 |
| Advanced Phenolic Resin | do | 4,020 | 15.1 | 6.5 | 10.7 |
| Green Phenolic Resin | do | 1,560 | 15.3 | 4.5 | 21.1 |

As can be seen by the results tabulated in Table I, the modulus of rupture for the combination green and advanced resin is higher than any of the other ones that are press cured but unbaked. Note also that the water absorption for the heat treated combination is much less than the others that are press cured in addition to the percent swell for the edges and at the center of the board.

Accordingly, in this invention the resin combination with the post press heat treatment gives overall properties to the board that are better than those developed by either resin used separately. As can be seen from the above data, it is readily apparent that the properties of the board with the combination resin system exhibits superior properties over boards made without the combination.

While specific details of a prefererd embodiment have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A process for forming composite boards, comprising the steps of; mixing comminuted wood and a binary resin binder system consisting of from 1 to 20 parts of a green phenolic resin to 1 part of an advanced phenolic resin; pressing the comminuted wood and binary resin binder system under heat and pressure a sufficient length of time to partially cure the binary binder system; then, heat treating the composite board a sufficient length of time to cure the binder system to form a composite board.

2. A process for forming composite boards, comprising the steps of; mixing comminute wood and a binary resin binder system consisting of 1 to 20 parts of a green phenolic resin to 1 part of an advanced phenolic resin; pressing the comminuted wood and binary resin binder system under heat and pressure for from 3–20 min. to partially cure the binary binder system; then, heat treating the composite board a sufficient length of time to cure the binder system to form a composite board.

3. A process for forming composite boards, comprising the steps of; mixing comminuted wood and a binary resin binder system consisting of 1 to 20 parts of a green phenolic resin to 1 part of an advanced phenolic resin; pressing the comminuted wood and binary resin binder system for from 3–20 min. at a temperature of from 300–500° F. to partially cure the binary binder system; then heat treating the composite board a sufficient length of time to cure the binder system to form a composite board.

4. A process for forming composite boards, comprising the steps of; mixing comminuted wood and a binary resin binder system consisting of 4 parts of green phenolic resin to 1 part of an advanced phenolic resin; pressing the comminuted wood and binary resin binder system for from 3–20 min. at a temperature of from 300–500° F. to partially cure the binary binder system; then, heat treating the composite board a sufficient length of time to cure the binder system to form a composite board.

5. A process for forming composite boards, comprising the steps of; mixing comminuted wood and a binary resin binder system consisting of 1 to 20 parts of a green phenolic resin to 1 part of an advanced phenolic resin; pressing the comminuted wood and binary resin binder system under heat and pressure for a sufficient length of time to partially cure the binary binder system; then heat treating the composite board for from 2½ to 6 hrs. to cure the binder system to form a composite board.

6. A process for forming composite boards, comprising the steps of; mixing comminuted wood and a binary binder system consisting of 1 to 20 parts of a green phenolic resin to 1 part of an advanced phenolic resin; pressing the comminuted wood and binary resin binder system for from 3–20 min. to partially cure the binary binder system; then, heat treating the composite board for from 2½ to 6 hrs. to cure the binder system to form a composite board.

7. A process for forming composite boards, comprising the steps of; mixing comminuted wood and a binary resin binder system consisting of 1 to 20 parts of a green phenolic resin to 1 part of an advanced phenolic resin; pressing the comminuted wood for from 3–20 min. at a temperature of 300–500° F. to partially cure the binary binder system; then, heat treating the composite board for from 2½ to 6 hrs. to cure the binary resin binder system to form a composite board.

8. A process for forming composite boards, comprising the steps of; mixing comminuted wood and a binary resin binder system consisting of 4 parts of green phenolic resin to 1 part of an advanced phenolic resin; pressing the comminuted wood for from 3–20 min. at a temperature of 300–500° F. to partially cure the binary resin binder system; then, heat treating the composite board for from 2½ to 6 hrs. to cure the binder system to form a composite board.

9. A process for forming composite boards, comprising the steps of; mixing comminuted wood and a binary resin binder system consisting of 4 parts of green phenolic resin to 1 part of an advanced phenolic resin; pressing the comminuted wood and binary resin binder system for 8 min. at a temperature of 400° F. to partially cure the binary binder system; then, heat treating the composite board for 3½ hrs. at a temperature of 340° F. to cure the binder system to form a composite board.

10. A process for forming composite boards, comprising the steps of; mixing comminuted wood and a binary resin system consisting of a green phenolic resin and an advanced phenolic resin; pressing the comminuted wood and binary resin binder system under heat and pressure a sufficient length of time to consolidate the comminuted wood; then, heat treating the thus formed board a sufficient length of time to cure the binary resin binder system to form a composite board.

References Cited by the Examiner

UNITED STATES PATENTS 2,413,729   1/1947   Rushmer _____ 264—122

FOREIGN PATENTS 556,510   4/1958   Canada.

OTHER REFERENCES

Food and Agriculture Organization of the United Nations, 1958, Fiberboard and Particleboard, Chapter IV, Process and Equipment, page 73.

ROBERT F. WHITE, *Primary Examiner.*

J. R. HALL, *Assistant Examiner.*